United States Patent [19]
Faucher et al.

[11] Patent Number: 5,404,543
[45] Date of Patent: Apr. 4, 1995

[54] METHOD AND SYSTEM FOR REDUCING AN AMOUNT OF POWER UTILIZED BY SELECTING A LOWEST POWER MODE FROM A PLURALITY OF POWER MODES

[75] Inventors: Marc R. Faucher, South Burlington; Christopher M. Herring, Westford; Mark W. Kellogg, Essex Junction, all of Vt.

[73] Assignee: International Business Machines Corporation, Armonk, N.Y.

[21] Appl. No.: 891,367

[22] Filed: May 29, 1992

[51] Int. Cl.[6] .................................. G06F 1/32
[52] U.S. Cl. .................... 395/750; 364/273.1; 364/DIG. 1; 365/227
[58] Field of Search ............ 395/750, 575; 364/707, 364/273.1, DIG. 1, 948, DIG. 2; 371/66, 12, 14; 365/226, 227

[56] References Cited

U.S. PATENT DOCUMENTS

| | | | |
|---|---|---|---|
| 4,293,927 | 10/1981 | Hoshii | 395/750 |
| 4,317,181 | 2/1982 | Teza et al. | 364/707 |
| 4,381,552 | 4/1983 | Nocilini et al. | 364/707 |
| 4,384,350 | 5/1983 | Lee et al. | 365/229 |
| 4,625,296 | 11/1986 | Shriver | 395/425 |
| 4,710,903 | 12/1987 | Hereth et al. | 365/194 |
| 4,716,551 | 12/1987 | Inagaki | 365/222 |
| 4,851,987 | 7/1989 | Day | 395/550 |
| 4,905,198 | 2/1990 | Oishi et al. | 365/222 |
| 4,985,869 | 1/1991 | Miyamoto | 365/226 |
| 5,041,964 | 8/1991 | Cole et al. | 395/425 |
| 5,129,091 | 7/1992 | Yorimoto et al. | 395/750 |
| 5,148,546 | 9/1992 | Blodgett | 395/750 |
| 5,163,124 | 11/1992 | Yabe et al. | 395/750 |
| 5,175,845 | 12/1992 | Little | 395/550 |
| 5,182,810 | 1/1993 | Bartling et al. | 395/750 |

OTHER PUBLICATIONS

Chan, Y. H. et al., "Variable Standby Current Source Scheme", Jun., 1984, IBM Technical Disclosure Bulletin, vol. 27, No. 1A, pp. 240-244.

*Primary Examiner*—Jack B. Harvey
*Assistant Examiner*—Glenn A. Auve
*Attorney, Agent, or Firm*—Heslin & Rothenberg

[57] ABSTRACT

A method and system for managing the utilization of power is provided. In a system having one or more devices, such as a memory subsystem having one or more banks of memory, the amount of power necessary for the operation of one or more of the devices is monitored and if possible, the power being supplied to one or more of the devices is reduced. A scoreboard located within a memory controller is used to retain the available power modes for each of the devices. When it is determined that it is desirable to reduce the power being supplied to a particular device, then the scoreboard is accessed in order to determine the lowest power level available for the device. Using this information, an amount of power commensurate with the lowest power level is applied to the device, thereby reducing the amount of power being applied to the device. In one aspect of the invention, a device is automatically placed in its lowest power level when it has not been accessed for a preselected amount of time.

37 Claims, 7 Drawing Sheets

METHOD AND SYSTEM FOR REDUCING AN AMOUNT OF POWER UTILIZED BY SELECTING A LOWEST POWER MODE FROM A PLURALITY OF POWER MODES

TECHNICAL FIELD

This invention relates in general to power management, and more particularly, to a method and system for managing the power utilized by a system such that the required amount of power for the system is reduced.

BACKGROUND ART

Power management in systems, such as personal and laptop computers, is essential to maximizing battery life, reducing the amount of power utilized by the system and enhancing the reliability of system components. Many components within a computer system utilize power, including the system memory.

Typically, only a portion of the supplied amount of system memory is used, however, the entire amount of memory continues to use valuable power resources. This needlessly increases the amount of power being used by the system and possibly decreases the reliability of one or more system components.

Therefore, a need exists for a technique to manage the utilization of power by a system such that the required amount of power is reduced. Further, a need exists for a technique which is capable of reducing the amount of power used by a system in a manner which is dynamic and independent of the system processor. A further need exists for a power management method and system which automatically places a device in its lowest available power mode when the device has not been accessed for a predetermined amount of time.

DISCLOSURE OF INVENTION

The shortcomings of the prior art are overcome and additional advantages are provided in accordance with the principles of the present invention through the provision of a method for reducing an amount of power used by a system having N devices. The method includes determining a plurality of power modes for at least one of the N devices, selecting from the plurality of power modes a lowest available power mode in which at least one of the N devices may be placed and placing at least one of the N devices in the lowest available power mode.

In one embodiment, the plurality of power modes is retrieved from a scoreboard and the lowest available power mode includes one of a depowered mode, a low voltage mode, a low voltage self-refresh mode, a self-refresh mode or an active mode. Further, placing a device in a depowered mode includes determining whether the device has been accessed in a predetermined amount of time and reducing a voltage level of the device to zero volts when the device has not been accessed within the predetermined amount of time.

In another aspect of the invention, a system for reducing an amount of power used by a system having N devices is provided. The system includes means for determining a plurality of power modes supported by at least one of the devices, means for selecting from the plurality of power modes a lowest available power mode in which at least one of the devices may be placed and placing at least one of the devices in the lowest available power mode.

In a further aspect of the invention, a method for automatically reducing an amount of power utilized by a system having N devices is provided. The method includes determining whether at least one of the N devices has been accessed within a preselected amount of time and decreasing an amount of power used by at least one of the devices, when the device has not been accessed within the preselected amount of time.

In one embodiment, decreasing the amount of power includes determining a plurality of available power modes for at least one of the N devices, selecting from the plurality of power modes a lowest available power mode for at least one of the N devices and reducing the power used by at least one of the N devices to the selected lowest power level.

In yet a further aspect of the present invention, a memory controller for a computer system having N devices is provided. The memory controller includes a computer interface having circuitry to perform a number of functions. The circuitry includes a scoreboard for storing a plurality of available power modes for at least one of the N devices and means for determining a lowest available power mode stored in the scoreboard for at least one of the N devices.

The power management technique of the present invention reduces the amount of power required by a system without the need for processor intervention or software or microcode modifications. The method and system of the present invention for managing the utilization of power provides for dynamic reduction in the amount of power used by one or more devices such that the total amount of power used by the system is reduced. Further, a user is capable of determining how many of the devices or how much of the memory may receive a reduction in power or even no power.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

BEST MODE FOR CARRYING OUT THE INVENTION

In accordance with the principles of the present invention, a method and system for managing power are described in detail herein. The power management technique of the present invention may be used to manage the power associated with a variety of devices. For instance, the power management method and system of the present invention may be used to manage the power associated with a memory subsystem or to manage the power being supplied to a number of disk drives or tape drives. In addition, the power management technique may be used in any situation in which it is desired to reduce the power being supplied to a number of devices. Device as used herein is meant to encompass all of the above situations. It includes, for instance, a memory chip, a memory bank or another segment of memory, a disk drive, a tape drive, a cartridge or any other components in which the technique of the present invention may be applied.

One example of a preferred embodiment of the method and system for managing power is described in detail herein with reference to the drawings. The method and system are described as they relate to power management for a computer memory subsystem (such as, for example, a memory subsystem in a personal computer or a laptop computer). It will be apparent to those of ordinary skill in the art that the method and system of power utilization, as described herein, may be used in a variety of computer systems and other systems.

Figure 1:
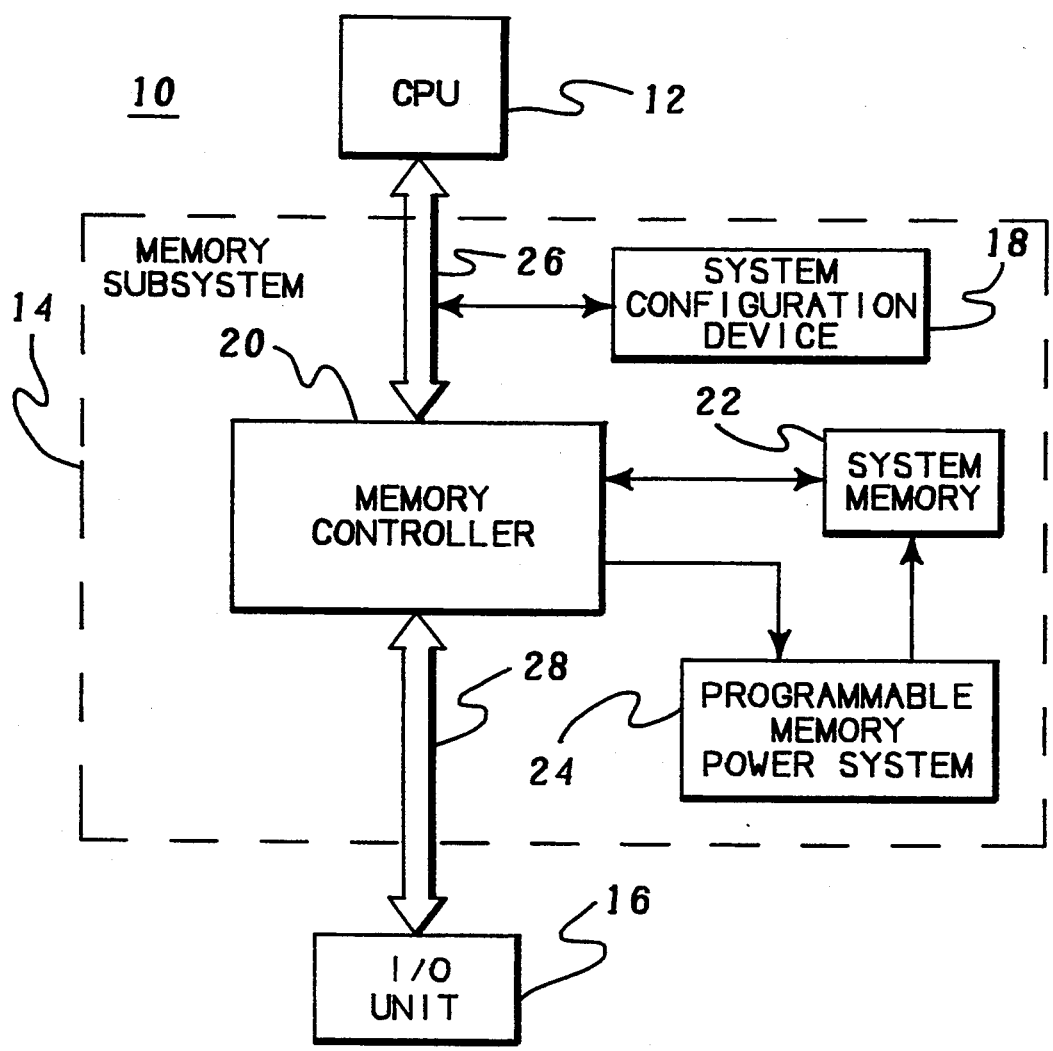
FIG. 1 depicts a block diagram of one embodiment of a computer processing system associated with the power management technique of the present invention.

Depicted in FIG. 1 is one example of the main components associated with a computer processing system 10. System 10 includes, for instance, a standard central processing unit (CPU) 12, a memory subsystem 14 and a standard input/output (I/O) unit 16. In one embodiment, memory subsystem 14 includes a conventional system configuration device 18, a memory controller 20, a system memory 22 and a programable memory power system 24. Each of the above-referenced components is described in further detail herein.

Central processing unit 12 contains the sequencing and processing facilities for controlling the operation of system 10 and is coupled to system configuration device 18 and memory controller 20 via a central processing unit bus 26. System configuration device 18 includes the configuration data for system 10 and may be, for example, an electrically erasable programmable read only memory (EEPROM) or read only memory (ROM).

Memory controller 20 is coupled to system memory 22 and programmable memory power system 24 and is used to control the access, activation and deactivation of system memory 22, in accordance with the principles of the present invention. The voltage supplied to system memory 22 is controlled, in accordance with the present invention, by programmable memory power system 24, which is coupled to system memory 22. As described in detail below, programmable memory power system 24 receives a number of inputs from memory controller 20 and based on the inputs determines how much voltage is to be supplied to system memory 22. This provides the flexibility of dynamically altering the voltage being supplied to system memory 22. (Programmable memory power system 24 is used, in accordance with the principles of the present invention, to reduce the voltage to one or more devices, thereby reducing the power to the device. It is also possible, however, to reduce the power of a device, as described in detail below, without altering the voltage and using the programmable memory power system.)

Memory controller 20 is also coupled to input/output unit 16 via an expansion bus 28. Input/output unit 16, includes, for instance, one or more typical input/output devices for providing information to or receiving information from system 10.

Figure 2:
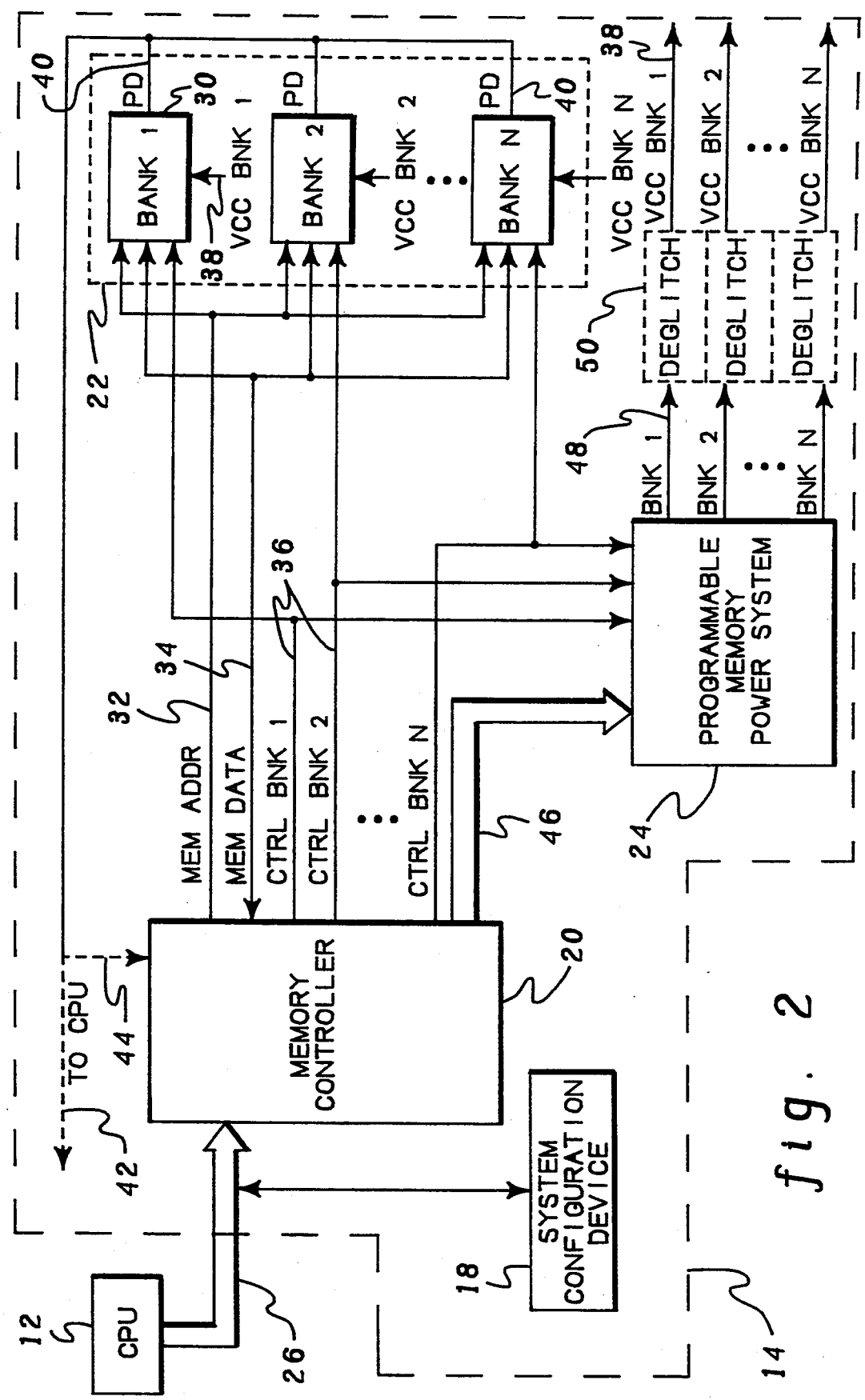
FIG. 2 illustrates one example of the main components associated with the memory subsystem depicted in FIG. 1, in accordance with the principles of the present invention.

Memory subsystem 14 is described in greater detail with reference to FIG. 2. Referring to FIG. 2, system memory 22 is, for example, dynamic random access memory (DRAM) and includes, for instance, a number of memory devices or banks 30. As used herein, a bank of memory designates the lowest granularity of memory that can be placed into a low power mode, in accordance with the principles of the present invention. A bank may be, for instance, a RAS (row address strobe) bank, a CAS (column address strobe) bank, one or more memory chips, one or more memory modules Or a segment of memory. In one embodiment, each bank is at least the width of CPU bus 26. As one example, if system memory 22 has sixteen megabytes of data, then the memory may include four banks of four megabytes each.

As depicted in FIG. 2, system memory 22 includes N banks 30 and each bank includes a number of inputs and one or more outputs. Input into each bank 30 are memory address lines 32, which specify the address of a memory location in a bank in which data may be read from or written to; a bidirectional memory data bus 34, which is the transport of data between memory controller 20 and system memory 22; a control bus 36, which includes the controls for each of the banks (e.g., RAS and CAS lines, read/write lines) and programmable memory power system 24; and a voltage input 38, which provides voltage to each of the banks of memory. As shown, in accordance with the principles of the present invention, each bank 30 has a separate voltage input 38 such that the power of each bank may be regulated separately.

One output of each bank is a presence detects bus 40. In one example, presence detects bus 40 is an encoded binary sequence of signals which represents a plurality of attributes such as, DRAM (memory) size, addressing, memory configuration, timing, and, in accordance with the present invention, the power modes for a bank, as described further below. Presence detects bus 40 may be either a serial bus or a parallel bus. The information on the presence detects bus 40 is passed either to central processing unit 12 (reference number 42) or directly to memory controller 20 (reference number 44). Should the information be passed to the central processing unit, the information is programmed through standard programmable input/output cycles and then, the programmed information is passed to the memory controller in order to advise the controller of the attributes of system memory 22.

As previously mentioned, control bank buses 36 are input into programmable memory power system 24, as well as, a voltage programmable bus 46. Control buses 36 indicate to programmable memory power system 24 which bank the data coming in on voltage programmable bus 46 is to be applied. Voltage Programmable bus 46 passes from memory controller 20 to programmable memory power system 24 a digital encoding of the voltage to be applied to the bank indicated by control bank buses 36. In one embodiment, programmable memory power system 24 includes a voltage regulator (e.g., a DC/DC regulator) for each bank in the memory. Each regulator receives a corresponding control bank bus 36 input and voltage programmable bus 46 input. The inputs are used to produce a voltage output signal 48 for each of the banks. Each of the voltage output signals go through a standard deglitch circuit 50 (one example of a deglitch circuit is offered by Toshiba and is described in Toshiba MOS Memory Products Package K-149 H3K-830, October 1991, which is hereby incorporated by reference). Each output of deglitch circuit 50 is the actual voltage signal 38 to be input to a respective bank 30.

Figure 3:
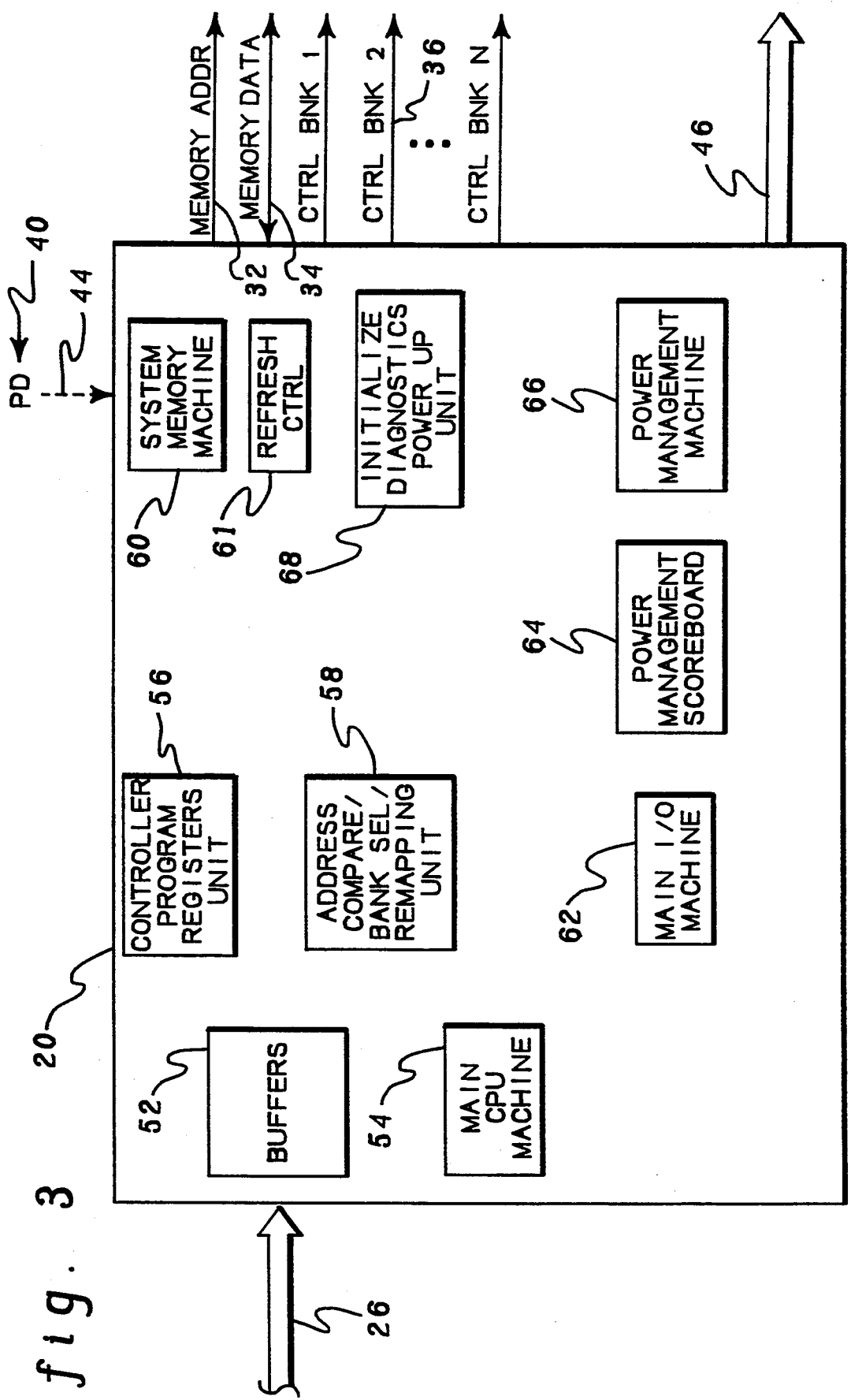
FIG. 3 depicts one embodiment of the main components of the memory controller depicted in FIG. 1, of the present invention.

Referring to FIG. 3, memory controller 20 is described in greater detail. Memory controller 20 is the unit that controls system memory 22 and includes, for instance, one or more buffers 52, a main central processing unit (CPU) machine 54, a controller program registers unit 56, an address compare/bank select/remapping unit 58, a system memory machine 60, a refresh control unit 61, a main I/O machine 62, a power management scoreboard 64, a power management machine 66 and an initialize diagnostics power up unit 68. Each of the main components of memory controller 20 is described in detail below.

Buffers 52 are optional and are used to reduce latency by stacking command and data which cannot be used at the time it is received by controller 20. For example, should the central processing unit want to write data to a bank of memory which is not powered up yet, then the data may be stored in one or more buffers so that the processor may continue working while the bank is being powered up.

Main CPU machine 54 is a conventional state machine which receives from central processing unit bus 26 each cycle that is input to controller 20. Main CPU machine 54 determines what type of cycle is being inputted, such as a read, write or input/output. In addition, it provides the timing, sequencing and coordination activities between central processing unit 12 and memory controller 20.

Controller program registers unit 56 includes one or more registers which receive and store the configuration information for system memory 22. Unit 56 includes, for instance, attributes (such as timing information, how long to hold the RAS or CAS, information concerning refresh), address support and bank address ranges for system memory 22.

Address compare/bank select/remapping unit 58 receives an address from the central processing unit or another component and performs an address compare to determine which bank corresponds to the address. In addition, the remapping portion of unit 58 handles remapping of one address to another.

System memory machine 60 is a state machine which handles the real time interface between the central processing unit and system memory 22. In accordance with the principles of the present invention, additional timing sequences have been added to system memory machine 60 to accommodate power up, depowered, pause and self-refresh cycles initiated by power management machine 66, as described in detail below. System memory machine 60 receives the address and bank information which is provided by address compare/bank select/remapping unit 58 and converts the address to RAS and CAS lines so that data may be written to or retrieved from the system memory.

Refresh control unit 61 is used to provide the necessary timing and controls to accomplish a refresh. As is known, refresh control unit 61 typically is present within the memory controller but it (or a portion of it) can reside outside of the controller.

Main I/O machine 62 is, for instance, a conventional state machine which manages the interface, in a two bus system, between the memory controller and input/output unit 16. If the system is a one bus system, then main CPU machine 54 and main I/O machine 62 may be combined.

In accordance with the principles of the present invention, power management scoreboard 64, power management machine 66 and initialize diagnostics power up unit 68 have been added to memory controller 20 in order to support the method and system for managing power utilization of the present invention.

Power management scoreboard 64 includes, for example, a global configuration register 70 (FIG. 4), a bank configuration register 72 and a bank status register 74, each of which is described in detail with reference to FIG. 4.

Figure 4:
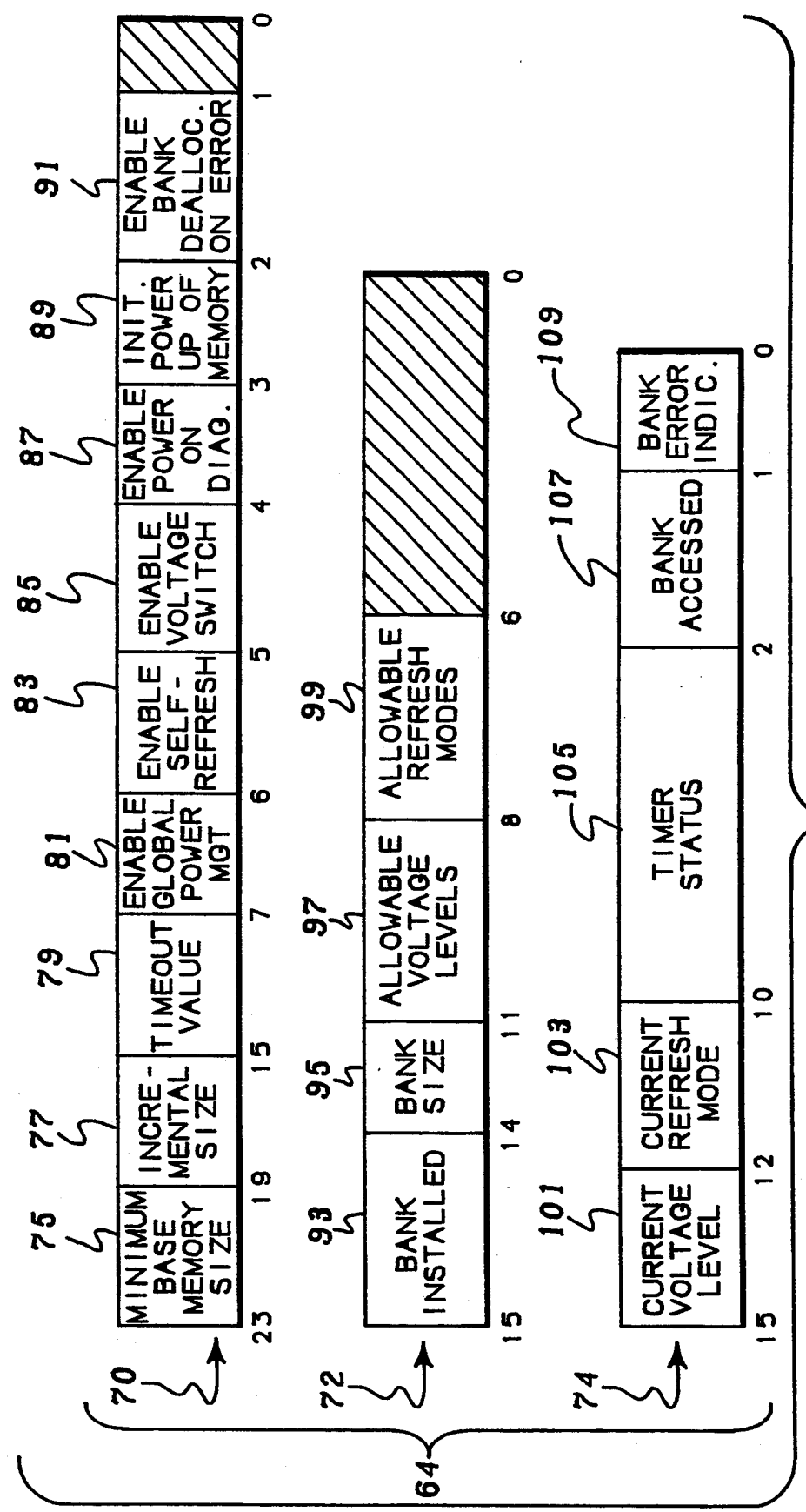
FIG. 4 depicts one embodiment of the main components of a power management scoreboard of the present invention.

Referring to FIG. 4, global configuration register 70 includes, for instance, a 4-bit minimum base memory size 75, which indicates the smallest size a bank of memory may be (e.g., 1M, 2M or 4M); a 4-bit incremental size 77, which indicates the amount of memory to be added when an increase in memory is desired; an 8-bit timeout value 79, which is referenced by each memory bank and indicates the amount of time that may elapse before a memory bank is lowered to a lower power mode; a 1-bit enable global power management indicator 81, which indicates whether power management is desired; a 1-bit enable self-refresh indicator 83, which indicates whether self-refresh mode is available; a 1-bit enable voltage switch indicator 85, which indicates whether a change in voltage is supported within the system; a 1-bit enable power on diagnostics indicator 87, which indicates whether diagnostics is to be performed when a bank is powered up; a 1-bit initial power up of all memory indicator 89, which indicates whether it is desired to have all of the memory banks initially powered up; and a 1-bit enable bank deallocation on error indicator 91, which indicates whether bank deallocation should take place if an error is encountered on bank power up. The information in the global configuration register is provided, for example, via both system detection of installed memory (e.g., presence detects 40) and customer provided memory usage parameters.

In one embodiment, there exists two copies of global configuration register 70: one for AC operation and one for DC operation. This provides the flexibility of having different global values for the system memory depending on the type of system operation. For example, timeout value 79 may equal, e.g., thirty minutes when the system is operating with AC and five minutes when operating with DC.

Bank configuration register 72 includes, for instance, a 1-bit bank installed indicator 93, which indicates whether a particular bank is installed; a 3-bit bank size value 95, which indicates the size of the memory bank; a 3-bit allowable voltage levels indicator 97, which indicates the acceptable voltage levels for a particular bank (e.g., 5 volts, 3.3 volts, 2.5 volts, 0 volts); and a 2-bit allowable refresh modes indicator 99, which indicates the supported refresh modes for a bank (e.g., self-refresh, low voltage self-refresh, refresh). Data is provided to the bank configuration register upon system interpretation of memory presence detects, as described further below. There exists one bank configuration register 72 for each memory bank 30 within system memory 22.

Bank status register 74 includes, for instance, a 3-bit current voltage level 101, which indicates the voltage level in which a bank is currently operating; a 2-bit current refresh mode 103, which indicates the present refresh mode of a particular bank; an 8-bit timer status 105, which indicates the amount of time which has elapsed since the bank was last accessed; a 1-bit bank accessed indicator 107, which indicates whether the bank has been accessed since diagnostics (excluding refresh); and a bank error indicator 109, which indicates whether or not the bank had an error on power up. Similar to bank configuration register 72, there exists one bank status register 74 for each bank located within system memory 22.

Current voltage level 101 and current refresh mode 103 reflect the current power mode of a memory bank. In one embodiment, the available power modes include: depowered, which indicates a bank of memory has no power applied to it and therefore, it does not dissipate any power; powered up, which indicates that a certain amount of leakage current is flowing through the memory bank, but the bank is not active; low voltage self-refresh, which indicates that a memory bank is reduced from one voltage to another (e.g., from 5 volts to 3.3 volts) when the bank is not being used or is simply refreshing itself; self-refresh, which indicates that a memory bank is refreshing itself and the current voltage level is maintained; low voltage, which indicates that a memory bank is dropped to a lower voltage; and an active mode, which indicates that a memory bank is active and fully powered up with normal refresh cycles. In accordance with the principles of the present invention, one or more of the above described power modes may be supported within a system, as well as a number of additional power modes, which are later developed.

Returning to FIG. 3, power management machine 66 includes one or more state machines which modify and act on bank status register 74 of power management scoreboard 64. In addition, power management machine 66 includes one or more resettable counters used to track the length of time since a particular bank has been accessed. In one example, there is one counter associated with each bank in system memory 22. The length of time is represented in timer status 105 of the power management scoreboard. Power management machine 66 also provides the control signals to system memory machine 60 in order to initiate, for instance, pause, pump-up, diagnostics for powering memory, pause for voltage changes and self-refresh entry, as described in detail below. Further, power management machine 66 provides digital encoding of a voltage value to programmable memory power system 24, in accordance with the principles of the present invention. The power management machine includes the logic and comparators needed for the power management technique of the present invention.

Initialize diagnostics power up unit 68, as it exists in memory controller 20, is used during the powering up of a depowered bank to provide test patterns, data checking and an indication of whether the bank is enabled and functioning properly. As one example, unit 68 receives the address range of the bank being powered up from controller program registers unit 56 under the direction of power management machine 66. Then, a data pattern is written to every address within the range or a subset of the addresses. After the data pattern is written, it is read to ensure that the memory bank is available and functioning properly. Any detected error is reported in bank status register 74 (i.e., bank error indicator 109). Based on the status of enable bank deallocation on error indicator 91 in global configuration register 70, the error is either flagged to central processing unit 12 (FIG. 1) or the bank is deallocated in any known manner.

Figure 5:
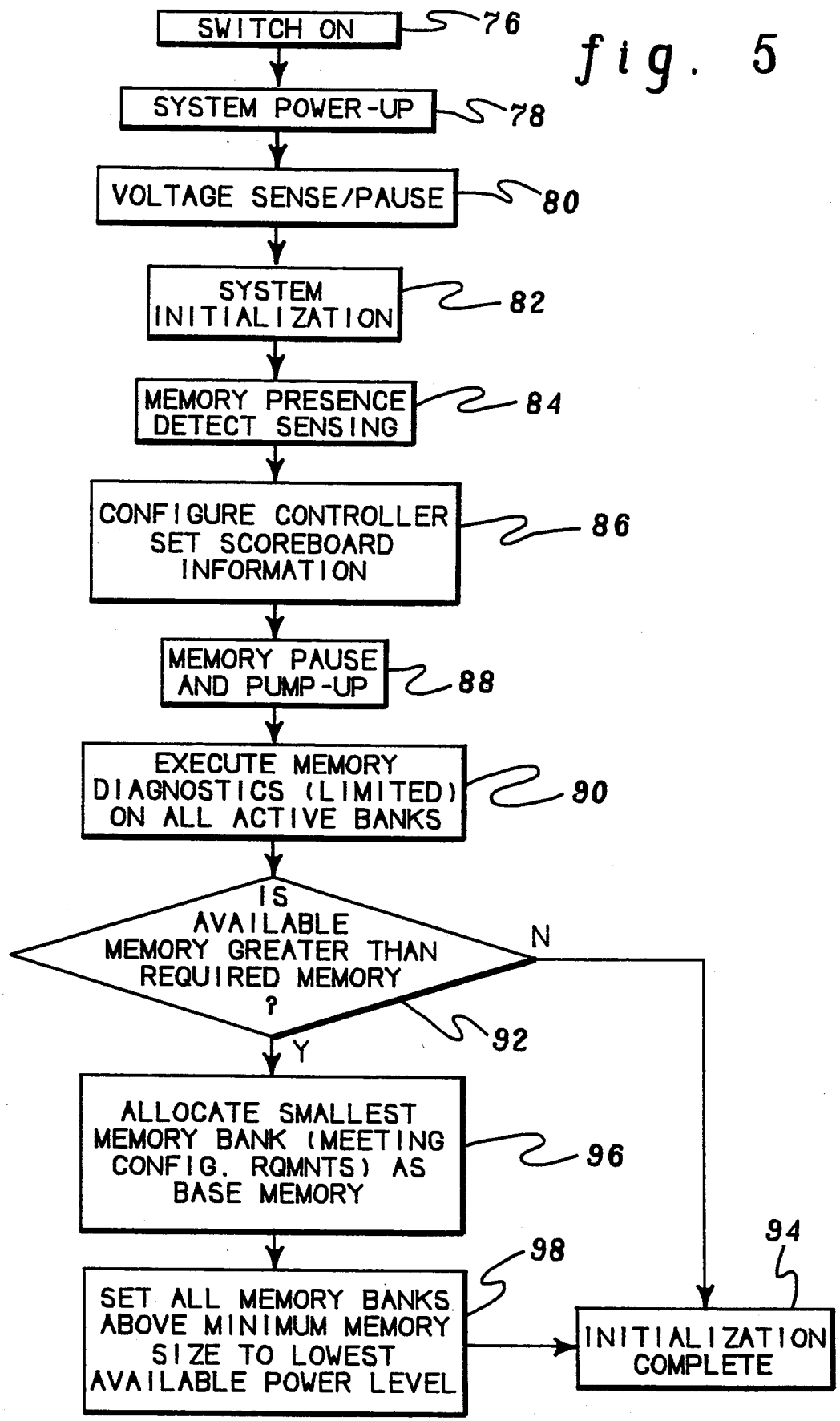
FIG. 5 depicts one example of a logic flow diagram for powering up a memory subsystem, in accordance with the principles of the present invention.

Referring to FIG. 5 in operation, when a system, such as system 10, is initialized, a power switch is turned on, STEP 76 "Switch On" and the system goes through a power-up sequence, which initially includes activating the power supply. In one embodiment, initial power up of memory indicator 89 (FIG. 4) indicates that all system memory banks 30 are to be activated, STEP 78 "System Power-Up." (In another embodiment, initial power up of memory indicator 89 may indicate that it is not necessary to activate all of system memory at this time.)

Subsequent to initiating the power, the power ramps up until it reaches a predetermined voltage value. When system 10 senses that it has reached that point, the system pauses to allow stabilization to take place, STEP 80 "Voltage Sense/Pause." Then, system initialization begins, STEP 82 "System Initialization."

During system initialization, central processing unit 12 begins executing instructions out of system configuration device 18. During instruction execution, the configuration data received from system configuration device 18 is provided to memory controller 20 and stored in controller program registers unit 56. The configuration data allows the controller to start accessing system memory 22. However, before system memory 22 is accessed, memory controller 20 (or other known support logic) reads the information supplied by presence detects bus 40 (see FIG. 2) and stores the information in, for instance, bank configuration register 72 of the power management scoreboard located within memory controller 20. As described previously, bank configuration register 72 includes information, such as which memory banks are available in system memory 22, the size of each bank, the allowable voltage levels and how the bank may be refreshed (if refreshing is available), STEP 84 "Memory Presence Detect Sensing."

Next, memory controller 20 is configured by the system code in system configuration device 18 (or the operating system) to include a number of attributes including, for example, timing information for the memory, manner in which the memory is to be accessed and the speed of the processor. In addition, global configuration register 70 of power management scoreboard 64 located within memory controller 20 is updated using the presence detects information on presence detects bus 40 and/or information provided by the software at system set-up, STEP 86 "Configure Controller Set Scoreboard Information." In addition, during controller configuration, the other components, such as address compare/bank select/remapping unit 58 is configured in order to indicate address mapping and the addressing mode.

Subsequent to configuring the controller and updating the scoreboard, a predetermined delay (e.g., approximately 100 milliseconds) of system memory 22 takes place, and then, the system memory is pumped up (e.g., eight cycles), STEP 88 "Memory Pause and Pump-Up."

After the pump-up step is completed, limited memory diagnostics are executed on all the active banks in system memory 22, STEP 90 "Execute Memory Diagnostics (Limited) On All Active Banks." In one embodiment, a bank is active if bank installed indicator 93 indicates that the bank is installed and current voltage level indicator 101 for that bank reflects a non-zero voltage level. In order to test each of the banks, a test pattern, for example, is written to each bank and then read in order to ensure that each of the banks is functional and therefore, valid.

After a determination is made as to the number of banks available in system memory 22 and whether the available banks are valid, a determination is made as to whether the amount of available memory is greater than the amount of required memory, as indicated by minimum base memory size 75 located in global configuration register 70, INQUIRY 92 "Is Available Memory Greater Than Required Memory?" In order to decide whether the available memory is greater than the required memory, power management machine 66 adds each of bank size 95 of bank configuration register 72 for each of the installed banks (also indicated by bank configuration register 72) and compares the result to minimum base memory size 75 in global configuration register 70. Should the result (i.e., the available memory) be less than or equal to the required memory, then initialization is complete, STEP 94 "Initialization Complete." On the other hand, if there are one or more memory banks in excess of the amount of memory required by the customer, the excess portion of memory may be de-allocated by memory controller 20, in accordance with the principles of the present invention.

When the available memory is greater than the required memory, then the least number of memory banks satisfying the configuration requirement stored in minimum base memory size 75 of global configuration register 70 is allocated as the base memory, STEP 96 "Allocate Smallest Memory Bank (Meeting Config. Rqmnts.) As Base Memory." In order to accomplish this, the memory addresses are reconfigured using address compare/bank select/remapping unit 58 and bank status register 74 is updated to reflect the current status of its corresponding bank which has been allocated. Specifically, for each allocated bank, information regarding the current voltage level, current refresh mode, timer status, bank accessed indication since diagnostics and bank error indication is retrieved from power management machine 66 and stored in a corresponding bank status register 74 of the power management scoreboard.

After the required number of banks to meet the configuration requirements are allocated, the remaining memory banks are set to their respective lowest available power level, in accordance with the principles of the present invention, STEP 98 "Set All Memory Banks Above Minimum Memory Size to Lowest Available Power Level."

Figure 6:
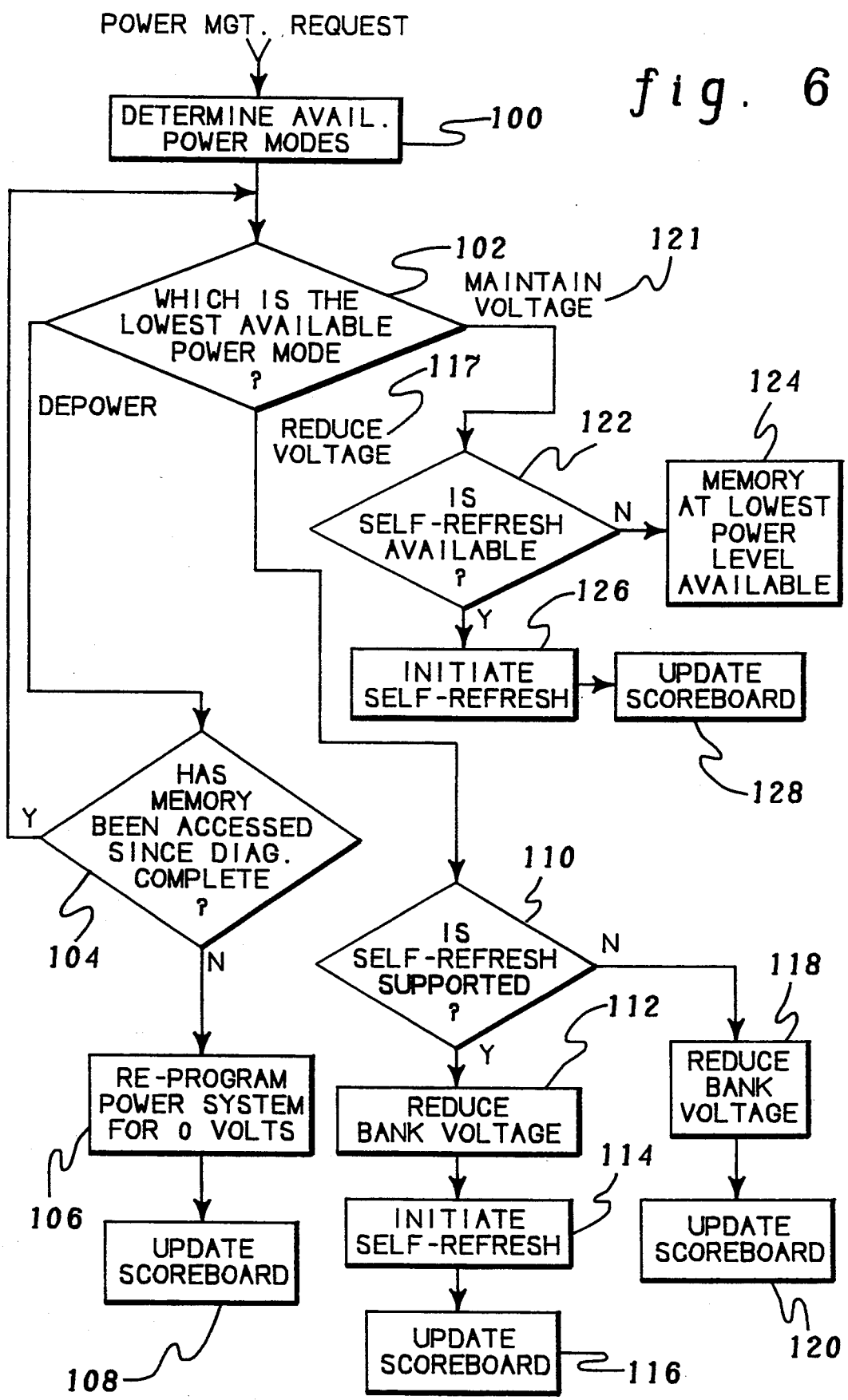
FIG. 6 depicts one example of a logic flow diagram for placing one or more banks of a memory subsystem in a lowest supported power level for each bank, in accordance with the principles of the present invention.

Referring to FIG. 6, in order to place one or more banks in its lowest available power mode, initially a determination is made as to the available power modes for each bank, STEP 100 "Determine Avail. Power Modes." This may be determined by referring to allowable voltage levels 97 in conjunction with allowable refresh modes 99 located in bank configuration register 72 of the power management scoreboard. (The available power modes may also be made available via, for example, a system command/interrupt, such as a power interrupt, a system operation or a switch.)

Next, the lowest available power mode for each bank is selected from the available power modes retrieved from power management scoreboard 64, INQUIRY 102 "Which is the Lowest Available Power Mode?"

In one embodiment, the lowest available power mode for a particular bank may be a depowered mode, a low voltage mode, a low voltage self-refresh mode, a self-refresh mode or an active mode, each of which is described in detail herein. Should bank configuration register 72 of the power management scoreboard indicate that the lowest available power mode for a bank is the depowered mode (i.e., allowable voltage levels 97 includes 0 volts), then initially, an inquiry is made as to whether the memory bank has been accessed, except for a refresh access, since diagnostics has been completed, INQUIRY 104 "Has Memory Been Accessed Since Diag. Complete?" If the memory bank has not been accessed since diagnostics, then the memory bank is depowered by applying a zero voltage to the bank, STEP 106 "Re-program Power System For 0 Volts."

In accordance with the principles of the present invention, in order to apply a zero voltage to the memory bank, voltage input 38 (FIG. 2) is set to zero volts by re-programming programmable memory power system 24. Programmable memory power system 24 receives its input from memory controller 20. In particular, power management machine 66 of memory controller 20 passes to programmable memory power system 24 an indication of the bank being depowered and an encoded digital value of zero volts via control bus 36 and voltage bus 46, respectively. Using the above inputs, programmable memory power system 24 produces therefrom a zero voltage output signal 48. Output signal 48 is then passed to deglitch circuit 50 to stabilize the output signal. Subsequently, the deglitched output signal 38 corresponding to zero volts is applied to the bank specified by control bus 36.

Subsequent to depowering the bank, power management scoreboard 64 is updated to reflect the zero voltage, STEP 108 "Update Scoreboard." In particular, the current voltage level and refresh mode, timer status, bank accessed indicator and bank error indicator of bank status register 74 are updated by the current values provided by power management machine 66.

Returning to INQUIRY 104, if the memory bank has been accessed since diagnostics was completed, then, in one embodiment, the voltage to the bank is not eliminated. Instead, flow returns to INQUIRY 102 and a determination is made as to the next lowest power mode.

If it is determined by checking allowable voltage levels 97 that the lowest power mode (or the next lowest power mode in the situation where the depowered mode is the lowest power mode but, the memory bank has been accessed since diagnostics) a bank may be placed is either a low voltage mode or a low voltage self-refresh mode, then the voltage being applied to the bank is reduced (reference numeral 117, FIG. 6), in accordance with the present invention.

Initially, an inquiry is made as to whether self-refresh is supported by the memory bank, INQUIRY 110 "Is Self-Refresh Supported?" In particular, allowable refresh modes 99 of bank configuration register 72 is checked to see if self-refresh mode is supported. Should self-refresh mode be supported, then the voltage applied to the applicable memory bank is reduced (low voltage self-refresh mode) to an acceptable lower level (e.g., a reduction from 5 volts to 3.3 volts) as indicated by allowable voltage levels 97 of bank configuration register 72, STEP 112 "Reduce Bank Voltage." In order to reduce the bank voltage, once again power management machine 66 located within memory controller 20 passes to programmable memory power system 24 the applicable control bus 36 and the desired voltage via voltage programmable bus 46. The programmable memory power supply system produces a desired voltage output signal 48, which is input to deglitch circuit 50. As described above, the output of deglitch circuit 50 is voltage input 38, which is applied to the memory bank which is to receive the reduced voltage.

Subsequently, self-refresh is initiated in a known manner, STEP 114 "Initiate Self-Refresh" and bank status register 74 of the power management scoreboard is updated to reflect, for instance, the reduced voltage level and the current refresh mode, STEP 116 "Update Scoreboard."

Referring once again to INQUIRY 110, if self-refresh is not supported, then the voltage being supplied to the memory bank is reduced (low voltage mode), STEP 118 "Reduce Bank Voltage" and the power management scoreboard is updated, STEP 120 "Update Scoreboard, " as described previously.

Returning to INQUIRY 102, if it is determined that the memory bank is currently at the lowest available voltage level (since, for instance, the particular system does not include programmable memory power system 24), then the voltage being applied to the bank is maintained (reference numeral 121). However, a decision is made as to whether the bank may be placed in a lower power mode by placing the bank in a self-refresh mode. Therefore, allowable refresh modes 99 of bank configuration register 72 is accessed to determine whether self-refresh is available for the bank, INQUIRY 122 "Is Self-Refresh Available?" Should self-refresh be unavailable, then the memory bank is at its lowest available power level and no action is taken, STEP 124 "Memory At Lowest Power Level Available." If, however, self-refresh is available, then self-refresh is initiated in order to place the bank in a lower power mode, STEP 126 "Initiate Self-Refresh." Thereafter, bank status register 74 of the power management scoreboard is updated via the power management machine in a manner described above, STEP 128 "Update Scoreboard."

As described above, in one embodiment, during initial memory power-ups any banks in excess of the minimum number of required banks, as defined by the customer configuration data stored in minimum base memory size 75 of the global configuration register, is set to its lowest available power level in order to preserve power resources. Therefore, when a memory request is made, the power level of the memory bank corresponding to the memory request is determined such that the voltage necessary or desired for the memory access may be applied to the bank before the access occurs and/or the bank is removed from self-refresh mode, as described in detail herein with reference to FIG. 7.

Figure 7:
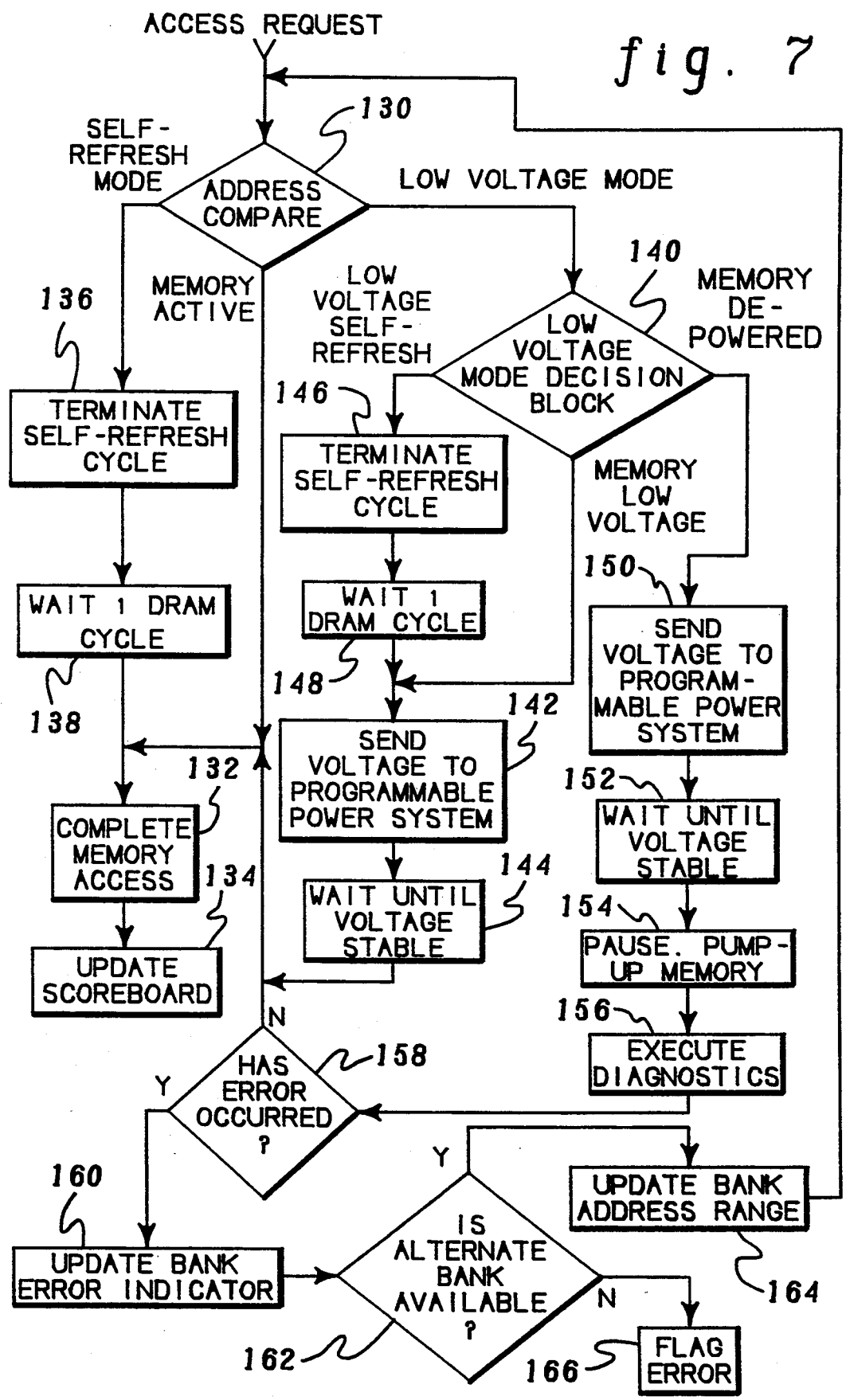
FIG. 7 depicts one example of a logic flow diagram for accessing a location within system memory, in accordance with the principles of the present invention.

Referring to FIG. 7, when a request for a particular memory location is requested by central processing unit 12 or a device within input/output unit 16, the memory address is passed to memory controller 20 via central processing unit bus 26 or expansion bus 28 depending on where the request is generated. Subsequent to the memory controller receiving the memory address, an address compare is performed by address compare/bank select/remapping unit 58 to indicate to the controller which bank corresponds to the incoming address, INQUIRY 130 "Address Compare." Once the appropriate memory bank is determined, bank status register 74 of the power management scoreboard is accessed in order to determine the current power level (i.e., the current voltage level and current refresh mode) of the memory bank.

Should there be an indication that the memory bank is operating at a suitable power level for a memory access (i.e., the bank is not currently in a low voltage or self-refresh mode), then the memory access is completed, STEP 132 "Complete Memory Access," and bank status register 74 of power management scoreboard 64 is updated using the information in power management machine 66 to reflect the new current status of the accessed bank, STEP 134 "Update Scoreboard." In addition, the resettable counter located in power management machine 66 corresponding to the accessed bank is reset indicating that the memory bank has been recently accessed.

Returning to INQUIRY 130, should it be determined that the memory bank is in the self-refresh mode, the self-refresh cycle is terminated by, for example, executing a sequence of timings, STEP 136 "Terminate Self-Refresh Cycle." Then, memory controller 20 is stalled for approximately one DRAM (Dynamic Random Access Memory) cycle to ensure that the bank is ready for access, STEP 138 "Wait 1 DRAM Cycle." After the bank is ready for access, the memory access is completed, STEP 132 "Complete Memory Access," and the scoreboard is updated, STEP 134 "Update Scoreboard," as previously described.

Referring once again in INQUIRY 130, if the memory bank is in a low voltage mode, a determination is made as to which of the following low voltage modes the memory bank is currently in: memory low voltage, low voltage self-refresh, memory depowered, INQUIRY 140 "Low Voltage Mode Decision Block?" If it is determined that the memory bank is in memory low voltage mode, then the voltage level of the memory bank is increased in the manner described herein.

Power management machine 66 of memory controller 20 passes to programmable memory power system 24 a control bus 36 corresponding to the memory bank which is to be accessed and the desired voltage amount on voltage programmable bus 46, STEP 142 "Send Voltage To Programmable Power System." Programmable memory power system 24 outputs a voltage output signal 48 which is then passed through deglitch circuit 50 to be stabilized. The output of deglitch circuit 50 is voltage input 38 representing the desired voltage to be applied to the memory bank being accessed. Voltage output 38 is passed to memory bank 30 corresponding to control bus 36 received from memory controller 20. After a sufficient amount of time elapses such that the voltage is stabilized, STEP 144 "Wait Until Voltage Stable," the memory access is completed, STEP 132 "Complete Memory Access" and the bank status register located within the power management scoreboard corresponding to the accessed bank is updated, STEP 134 "Update Scoreboard."

Returning to decision block 140, should it be determined that the memory bank being accessed is in low voltage self-refresh mode, then the self-refresh cycle is terminated, STEP 146 "Terminate Self-Refresh Cycle," and the system is stalled for approximately one DRAM cycle, STEP 148 "Wait 1 DRAM Cycle," as described previously. Subsequently, the voltage being supplied to the memory bank is increased to a predetermined value. As described previously, in order to increase the voltage to a particular memory bank, power management machine 66 passes the appropriate voltage level to programmable memory power system 24 via voltage programmable bus 46, as well as control bus 36 corresponding to the bank to be accessed, and outputs voltage signal 48, STEP 142 "Send Voltage To Programmable Power System." Then, signal 48 is input to deglitch circuit 50 to be stabilized and then, the output of the deglitch circuit, input signal 38, is passed to the appropriate bank. After a sufficient amount of time elapses such that the voltage is stabilized, STEP 144 "Wait Until Voltage Stable," the memory access is completed, STEP 132 "Complete Memory Access," and the scoreboard is updated to reflect the new power level of the bank, STEP 134 "Update Scoreboard." In particular, as described previously, current voltage level 101, current refresh mode 103, timer status 105, bank accessed indicator 107 and bank error indicator 109 of bank status register 74 are updated by the power management machine.

On the other hand, should decision block 140 indicate that the memory is depowered (i.e., zero volts are being applied to the memory bank), an increased voltage amount is supplied to the appropriate bank, STEP 150 "Send Voltage To Programmable Power System" as described before and sufficient time is elapsed until the voltage is stable (also described above), STEP 152 "Wait Until Voltage Stable."

Subsequently, the system pauses and the memory bank is pumped-up using power management machine 66, STEP 154 "Pause Pump-Up Memory." Thereafter, a minimum amount of diagnostics is executed, by for instance, testing the boundaries of the memory bank by sending a simple pattern to the memory bank and reading the pattern back, to ensure that the memory bank is working, STEP 156 "Execute Diagnostics." (The diagnostics step is not required, but is recommended in order to test, for example, whether the memory is capable of receiving data prior to sending data to the bank. Enable power on diagnostics indicator 87 is checked to see whether or not diagnostics testing is to take place.) If a memory bank is found to have an error, INQUIRY 158 "Has Error Occurred," bank error indicator 109 is updated to reflect the error and then, a determination is made as to whether another bank is available, INQUIRY 162 "Is Alternate Bank Available?"

In order to determine whether another bank is available, each bank installed indicator 93 is checked to see which additional banks are available. Available banks would include either powered banks that have never been accessed since diagnostics (as indicated by bank access bit 107), or an unpowered bank (as indicated by current voltage level bit 101). Once another available bank is identified, the controller register's program unit 56 is updated to reflect the new address range for the available bank. Flow then returns to step 130 "address compare."

On the other hand, if there are no alternate banks, then the error is flagged to central processing unit 12 and system 10 enters diagnostic/recovery mode, STEP 166 "Flag Error."

Returning to INQUIRY 158, if an error has not occurred and diagnostics are complete, then the memory access is completed, STEP 132 "Complete Memory Access" and the bank status register of the power management scoreboard is updated to reflect the newly powered up bank, STEP 134 "Update Scoreboard."

In one preferred embodiment of the present invention, the power to one or more memory banks may be automatically lowered or eliminated when the bank is not accessed for a preselected amount of time. Bank access timers or counters located within the power management machine are used to keep track of the amount of time which has elapsed since each of the memory banks has been accessed. If a particular memory bank has not been accessed within a pre-established time period, then memory controller 20 attempts to reduce or eliminate the power being supplied to the unaccessed memory bank. The manner in which this is accomplished was described previously with reference to FIG. 6. That is, a determination is made as to the available power modes for a particular bank and then the lowest available power mode is determined. Based on the selected lowest available power mode, memory controller 20 and in particular, power management scoreboard 64 and power management machine 66 are used, as described in detail above, in placing the unaccessed memory bank in the lowest available power mode.

Although the power management method and system of the present invention has been described in detail with reference to a memory subsystem, the power management technique of the present invention may be used with a variety of systems.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for reducing an amount of power used by a system having one or more devices, said method comprising the steps of:
   determining a plurality of power supply modes for a device of said system, said plurality of power supply modes being stored in a scoreboard;
   selecting from said plurality of power supply modes a lowest power mode for said device; and
   altering an amount of power supplied to said device, said altering step comprising placing said device in said selected lowest power mode.

2. The method of claim 1, wherein said lowest power mode includes one of a depowered mode, a low voltage mode, a low voltage self-refresh mode, a self-refresh mode and an active mode.

3. The method of claim 2, wherein said lowest power mode comprises said depowered mode and said placing step comprises the steps of:
   determining whether said device has been accessed in a predetermined amount of time; and
   reducing a voltage level of said device to zero volts, when said device has not been accessed in said predetermined amount of time.

4. The method of claim 3, wherein said placing step further includes the step of updating said scoreboard to reflect said lowest power mode.

5. The method of claim 2, wherein said lowest power mode comprises said low voltage self-refresh mode and said placing step comprises the steps of:
   reducing a voltage level of said device to a predetermined level;
   initiating a self-refresh cycle; and
   updating said scoreboard to reflect said lowest power mode.

6. The method of claim 2, wherein said lowest power mode comprises said low voltage mode and said placing step comprises the steps of:
   reducing a voltage level of said device to a predetermined level; and
   updating said scoreboard to reflect said lowest power mode.

7. The method of claim 2, wherein said lowest power mode comprises said self-refresh mode and said placing step comprises the steps of:
   initiating a self-refresh cycle; and
   updating said scoreboard to reflect said lowest power mode.

8. The method of claim 1, wherein said system has more than one device and each of said more than one device has a plurality of power supply modes associated therewith.

9. The method of claim 1, wherein the scoreboard is programmable.

10. The method of claim 1, wherein said plurality of power supply modes comprises more than two power supply modes.

11. A system for reducing an amount of power used by a system having one or more devices, said system comprising:
    means for determining a plurality of power supply modes supported by a device of said system, said plurality of power supply modes being stored in a scoreboard;
    means for selecting from said plurality of power supply modes a lowest power mode for said device; and
    means for altering an amount of power supplied to said device, said altering means comprising means for placing said device in said lowest power mode.

12. The system of claim 11, wherein said lowest power mode includes one of a depowered mode, a low voltage mode, a low voltage self-refresh mode, a self-refresh mode and an active mode.

13. The system of claim 12, wherein said lowest power mode comprises said depowered mode and said means for placing comprises:
    means for determining whether said device has been accessed in a predetermined amount of time; and
    means for reducing a voltage level of said device to zero volts, when said device has not been accessed in said predetermined amount of time.

14. The system of claim 13, wherein said means for placing further comprises means for updating said scoreboard to reflect said lowest power mode.

15. The system of claim 12, wherein said lowest power mode comprises said low voltage self-refresh mode and said means for placing comprises:
    means for reducing a voltage level of said device to a predetermined level;
    means for initiating a self-refresh cycle; and
    means for updating said scoreboard to reflect said lowest power mode.

16. The system of claim 12, wherein said lowest power mode comprises said low voltage mode and said means for placing comprises:
    means for reducing a voltage level of said device to a predetermined level; and
    means for updating said scoreboard to reflect said lowest power mode.

17. The system of claim 12, wherein said lowest power mode comprises said self-refresh mode and said means for placing comprises:
    means for initiating a self-refresh cycle; and
    means for updating said scoreboard to reflect said lowest power mode.

18. The system of claim 11, wherein said system has more than one device and each of said more than one device has a plurality of power supply modes associated therewith.

19. The system of claim 11, wherein the scoreboard is programmable.

20. The system of claim 11, wherein said plurality of power supply modes comprises more than two power supply modes.

21. A method for automatically reducing an amount of power utilized by a system having one or more devices, said method comprising the steps of:
    determining whether a device of said system has been accessed within a preselected amount of time;
    selecting from a scoreboard an amount of power to be supplied to said device; and
    supplying to said device said selected amount of power when said device has not been accessed within said preselected amount of time.

22. The method of claim 21, wherein said selecting step includes the steps of:
    determining a plurality of power supply modes for said device; and
    selecting from said plurality of power supply modes a lowest power mode for said device.

23. The method of claim 22, wherein said lowest power mode includes one of a depowered mode, a low voltage mode, a low voltage self-refresh mode, a self-refresh mode and an active mode.

24. The method of claim 21, wherein the scoreboard is programmable.

25. A system for automatically reducing an amount of power utilized by a system having one or more devices, said system comprising:
    means for determining whether a device of said system has been accessed within a preselected amount of time;
    means for selecting from a scoreboard an amount of power to be supplied to said device; and
    means for supplying to said device said selected amount of power when said device has not been accessed within said preselected amount of time.

26. The system of claim 25, wherein said means for selecting comprises:
    means for determining a plurality of available power supply modes for said device; and
    means for selecting from said plurality of power supply modes a lowest power mode for said device.

27. The system of claim 26, wherein said lowest power mode includes one of a depowered mode, a low voltage mode, a low voltage self-refresh mode, a self-refresh mode and an active mode.

28. The system of claim 25, wherein the scoreboard is programmable.

29. A memory controller for a computer system having one or more devices, said memory controller comprising a computer interface having circuitry to perform a number of functions, said circuitry including a scoreboard for storing a plurality of power modes for at least one of said one or more devices and means for determining a lowest power mode stored in said scoreboard for at least one of said one or more devices.

30. The memory controller of claim 29, wherein said memory controller is coupled to a voltage generation means and wherein said voltage generation means receives from said memory controller a voltage value indicative of said lowest power mode.

31. The memory controller of claim 30, further comprising at least one counter, said at least one counter being used to indicate whether said at least one of said one or more devices has been accessed in a predetermined amount of time.

32. A method for reducing an amount of power used by a system having one or more devices, said method comprising the steps of:
   determining more than two voltage supply levels for a device of said system, said more than two voltage supply levels being stored within said system;
   selecting from said more than two voltage supply levels a lowest voltage level for said device; and
   placing said device at said selected lowest voltage level.

33. A system for reducing an amount of power used by a system having one or more devices, said system comprising:
   means for determining more than two voltage supply levels for a device of said system, said more than two voltage supply levels being stored within said system;
   means for selecting from said more than two voltage supply levels a lowest voltage level for said device; and
   means for placing said device at said lowest voltage level.

34. A method for reducing an amount of power used by a system having one or more memory banks, said method comprising the steps of:
   determining a plurality of power modes for a memory bank of said system, said plurality of power modes being stored within said system;
   selecting from said plurality of power modes a lowest power mode for said memory bank; and
   placing said memory bank in said lowest power mode.

35. The method of claim 34, wherein said system has a plurality of memory banks and wherein said determining step determines a plurality of power modes for each memory bank, and wherein said selecting step selects for each memory bank a lowest power mode for that memory bank, and wherein said placing step places each memory bank in its lowest power mode.

36. A system for reducing an amount of power used by a system having one or more memory banks, said method comprising:
   means for determining a plurality of power modes for a memory bank of said system, said plurality of power modes being stored within said system;
   means for selecting from said plurality of power modes a lowest power mode for said memory bank; and
   means for placing said memory bank in said lowest power mode.

37. The system of claim 36, wherein said system has a plurality of memory banks and wherein said means for determining determines a plurality of power modes for each memory bank, and wherein said means for selecting selects for each memory bank a lowest power mode for that memory bank, and wherein said means for placing places each memory bank in its lowest power mode.

* * * * *